Sept. 29, 1925.

J. W. HASSELKUS 1,555,712

MOTION PICTURE MACHINE

Filed Nov. 13, 1922

INVENTOR
JOHN WILLIAM HASSELKUS
by his Attorneys
Howson and Howson

Patented Sept. 29, 1925.

1,555,712

UNITED STATES PATENT OFFICE.

JOHN WILLIAM HASSELKUS, OF CLAPHAM COMMON, LONDON, ENGLAND, ASSIGNOR TO ROSS LIMITED, OF CLAPHAM COMMON, LONDON, ENGLAND, A COMPANY OF GREAT BRITAIN.

MOTION-PICTURE MACHINE.

Application filed November 13, 1922. Serial No. 600,706.

*To all whom it may concern:*

Be it known that I, JOHN WILLIAM HASSELKUS, a subject of the King of Great Britain, and resident of Clapham Common, county of London, England, have invented certain new and useful Improvements in Motion-Picture Machines, of which the following is a specification.

This invention relates to moving picture projectors and more particularly to the hollow member, for the passage of light from the lighting means to the film as it passes the aperture in the gate, the said invention having for its objects to so construct, or form, the said hollow member that heat is efficiently absorbed, or dispersed, and stray rays of light from the lighting means are trapped and properly directed onto the film.

To effect these objects a hollow member having its internal cross-sectional area reduced from the end next the lighting means towards the end next the film is provided with a portion which projects outside the casing of the apparatus and towards the lighting apparatus. This hollow member is also provided with internal ribs, or other projections, for the purpose of trapping and directing stray rays of light and absorbing heat; further, the exterior (and more especially the exterior of the portion projecting towards the lighting means, is preferably provided with ribs, or other projections, for the purpose of absorbing, or dispersing, heat.

I will describe, with reference to the accompanying drawing how the invention may be performed, it being understood that the invention is not limited to the particular forms illustrated in the drawing. The example taken presumes that the ribs, or projections, are to be applied both to the interior and the exterior of the hollow member and that the said hollow member is four-sided, or square, in cross-section.

In the accompanying drawings:

Fig. 3 is a longitudinal sectional view of my hollow member; while

Figure 2:
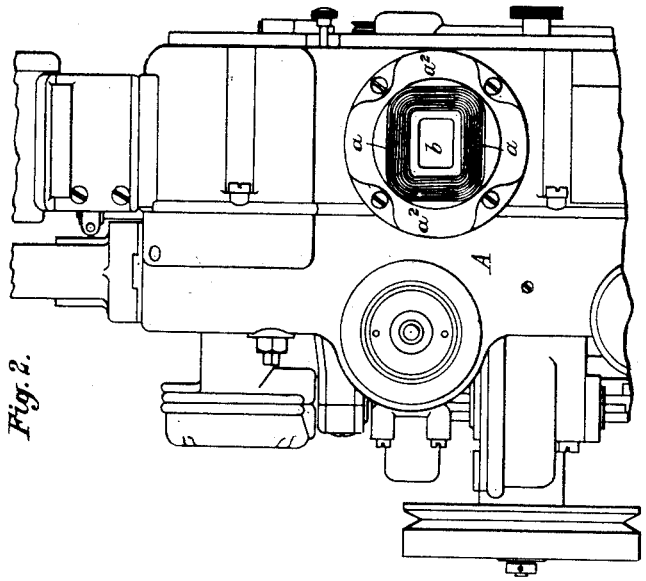
Fig. 2 is a rear elevation of the part shown in Fig. 1.
Figure 5:
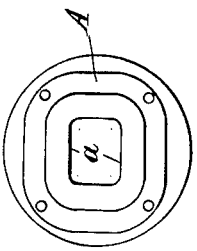
Figs. 4 and 5 are views of my hollow member taken from the ends.
Figure 4:
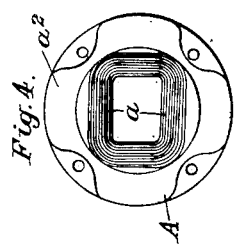
Figure 1:
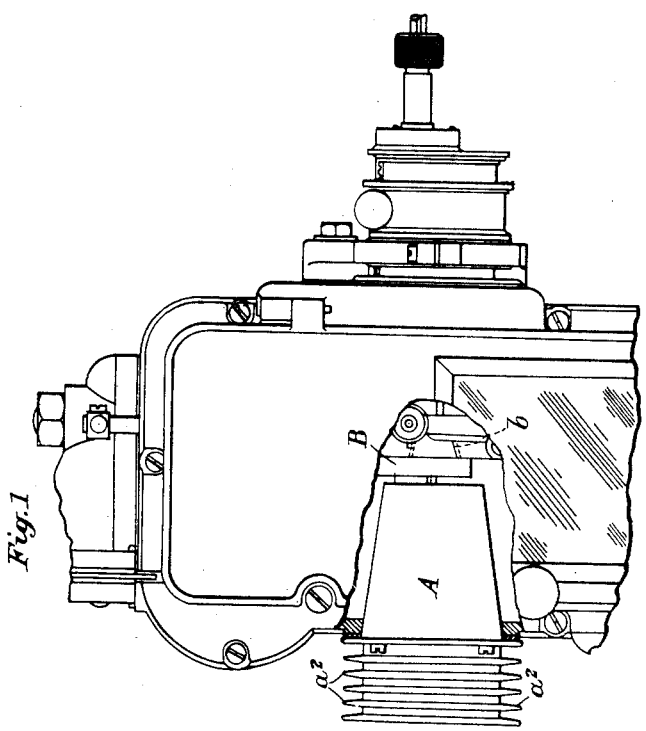
Fig. 1 is a side elevation, partly in section, of sufficient of the upper part of a moving picture projector to illustrate the application of my hollow member thereto.
Figure 3:
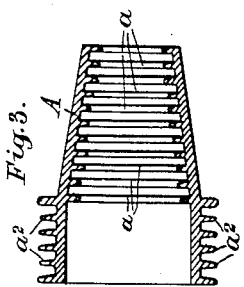

To the main frame, or casing, of the apparatus, on the side which, in use, is presented to the lighting means, such as the usual arc-lamp and condenser, the hollow member A, is secured, it being reduced in internal cross-sectional area towards the end which approaches the aperture, $b$ in the gate B which is indicated in dotted lines in Figure 2. The interior of the said hollow member has internal ribs $a$ forming apertures of a shape the same as, or similar to, that of the aperture $b$ in the gate and successively decreasing in size as they approach the said aperture $b$. The said hollow member is shown as having the portion which projects outside the casing, and extends towards the lighting means, formed with the sides parallel but this portion may, if desired, also be made reduced in cross-sectional area as it approaches the inner portion. The said outwardly projecting portion is shown as having ribs $a^2$ on its outer sides. Heat and light rays which enter the hollow member A, from the lighting means, are trapped by the successive ribs $a$, or equivalent projections which will trap and properly direct the stray light and absorb the superfluous heat and keep the gate and internal parts comparatively cool, or free from excessive heat, even after long running with electric current of high amperage. The ribs $a^2$, or equivalent projections, efficiently radiate heat which has been absorbed by the inner ribs $a$, or equivalent projections.

Having now particularly described and ascertained the nature of my said invention and in what manner the same is to be performed, I declare that what I claim is:—

1. In apparatus for exhibiting moving pictures, a casing, a hollow member between the lighting means and the film constituting the passage for light from the lighting means to the film, the said hollow member having a cross-sectional internal area reduced from the end next the lighting means towards the end next the film and a portion of said hollow member projecting outside said casing, in combination with ribs inside said hollow member arranged substantially as, and for the purpose, hereinbefore described.

2. In apparatus for exhibiting moving pictures, a casing, a hollow member between the lighting means and the film constituting the passage for light from the lighting means to the film, the said hollow member having a cross-sectional internal area reduced from the end next the lighting means towards the end next the film and a portion of said hollow member projecting outside said casing, in combination with ribs inside said hollow member, and on the outside of the projecting portion of said hollow member to radiate heat, substantially as, and for the purpose, hereinbefore described.

In testimony whereof I have signed my name to this specification.

JOHN WILLIAM HASSELKUS.